United States Patent
Kawahara

(10) Patent No.: US 7,418,152 B2
(45) Date of Patent: Aug. 26, 2008

(54) METHOD AND DEVICE OF IMAGE CORRECTION

(75) Inventor: Isao Kawahara, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 411 days.

(21) Appl. No.: 10/542,026

(22) PCT Filed: Feb. 17, 2005

(86) PCT No.: PCT/JP2005/002943

§ 371 (c)(1),
(2), (4) Date: Jul. 11, 2005

(87) PCT Pub. No.: WO2005/079059

PCT Pub. Date: Aug. 25, 2005

(65) Prior Publication Data

US 2006/0050979 A1    Mar. 9, 2006

(30) Foreign Application Priority Data

Feb. 18, 2004    (JP)    ............................... 2004-041108

(51) Int. Cl.
*G06K 9/40* (2006.01)
*G06K 9/00* (2006.01)
*G09G 5/10* (2006.01)
*G09G 3/28* (2006.01)
*G09G 5/02* (2006.01)
*G09G 5/00* (2006.01)

(52) U.S. Cl. ..................... 382/266; 382/103; 382/107; 382/274; 382/275; 345/690; 345/63; 345/589; 345/616

(58) Field of Classification Search ................... 348/60, 348/63, 204, 690, 696, 589; 382/266–269, 382/275

See application file for complete search history.

(56) References Cited

U.S. PATENT DOCUMENTS 6,144,364 A    11/2000    Otobe et al.

(Continued)

FOREIGN PATENT DOCUMENTS

JP    11-231823    8/1999

(Continued)

OTHER PUBLICATIONS

Supplementary European Search Report issued Jan. 16, 2008 in the International (PCT) Application of which the present application is the U.S. National Stage.

*Primary Examiner*—Bhavesh Mehta
*Assistant Examiner*—Nathan Bloom
(74) *Attorney, Agent, or Firm*—Wenderoth, Lind & Ponack, L.L.P.

(57) ABSTRACT

An Image correction device for detecting an image area having movement according to an image signal, and providing the image signal with image correction and switching correction methods according to a control signal. The image correction device further detects the boundary area of the image area having movement; detects an image area with great gradational change by comparing gradation of image signals corresponding to adjoining pixels; and provides the boundary area of the image area having movement with a diffusion process in an area excluding the image area with great gradational change. The correcting methods performed by the image correcting device can be switched according to the movement signal, thereby improving image correction.

6 Claims, 8 Drawing Sheets

U.S. PATENT DOCUMENTS

| | | | |
|---|---|---|---|
| 6,335,735 B1* | 1/2002 | Denda et al. | 345/589 |
| 6,496,194 B1* | 12/2002 | Mikoshiba et al. | 345/596 |
| 6,661,469 B1* | 12/2003 | Kawabata et al. | 348/607 |
| 6,661,470 B1* | 12/2003 | Kawamura et al. | 348/699 |
| 6,690,388 B2* | 2/2004 | Kasahara et al. | 345/690 |
| 7,071,902 B1* | 7/2006 | Kawahara | 345/63 |
| 7,304,672 B2* | 12/2007 | Sai et al. | 348/252 |
| 2002/0005857 A1* | 1/2002 | Kasahara et al. | 345/611 |
| 2002/0097439 A1* | 7/2002 | Braica | 358/3.26 |
| 2003/0048285 A1* | 3/2003 | Okuzawa et al. | 345/690 |
| 2003/0090444 A1* | 5/2003 | Jeong | 345/60 |
| 2004/0070590 A1* | 4/2004 | Lee et al. | 345/690 |
| 2004/0155891 A1* | 8/2004 | Kang | 345/690 |
| 2004/0227978 A1* | 11/2004 | Enomoto | 358/3.26 |
| 2005/0225512 A1* | 10/2005 | Yamada et al. | 345/63 |
| 2006/0072044 A1* | 4/2006 | Kawamura et al. | 348/797 |
| 2006/0139289 A1* | 6/2006 | Yoshida et al. | 345/98 |

FOREIGN PATENT DOCUMENTS

| | | |
|---|---|---|
| JP | 2001-034229 | 2/2001 |
| JP | 2004-004800 | 1/2004 |
| WO | WO0062275 | * 10/2000 |

* cited by examiner

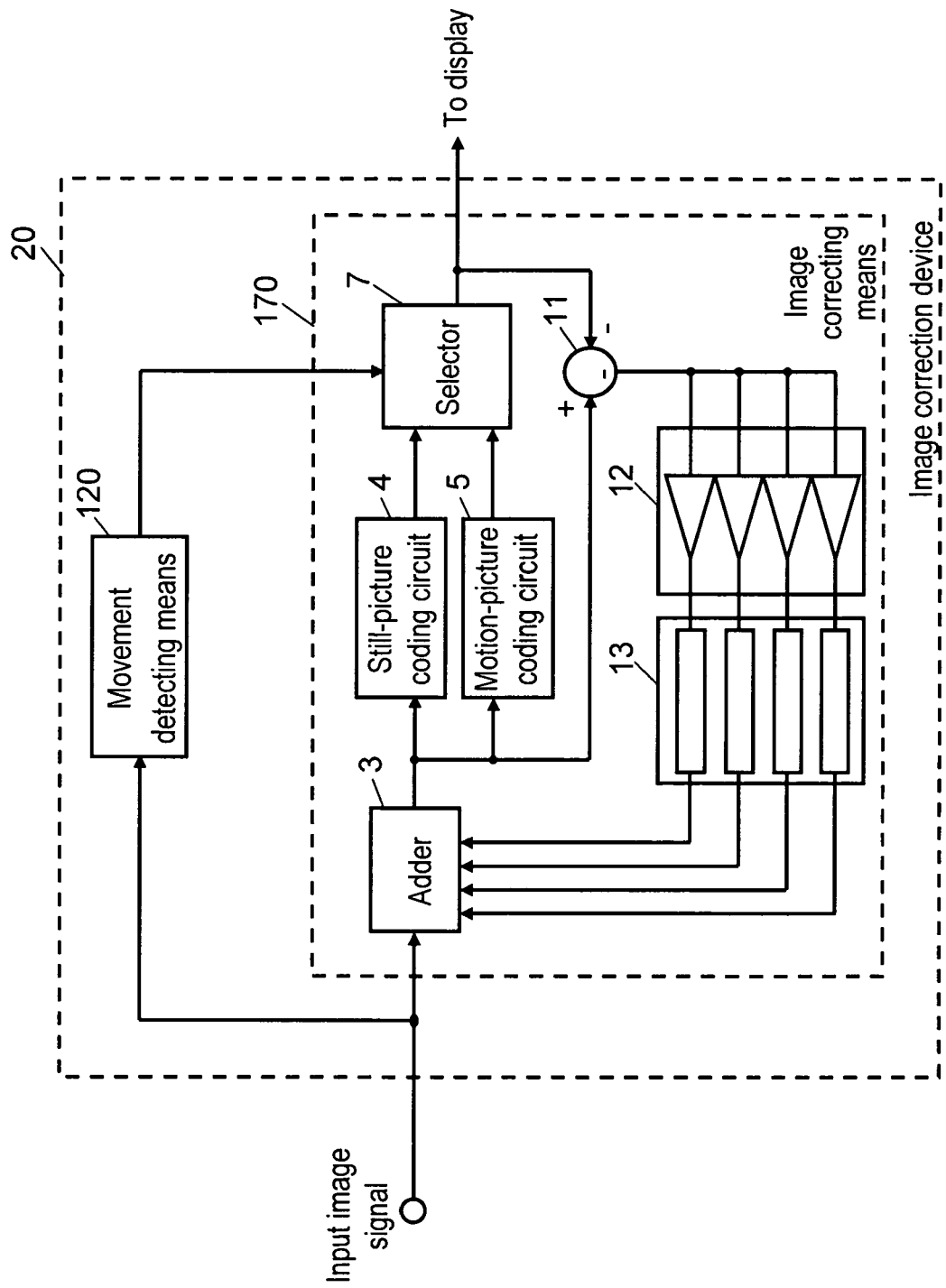
FIG. 8 – PRIOR ART

METHOD AND DEVICE OF IMAGE CORRECTION

TECHNICAL FIELD

The present invention relates to an image correction method and device that process image signals according to movement of images.

BACKGROUND ART

Conventionally, some suggestions have been made regarding image signal correction devices. Such a device detects movement of an image and processes an image signal differently between the area with a still picture and the area with a motion picture. For example, Japanese Patent Unexamined Publication No. 2001-34229 discloses a method of correcting dynamic pseudo contour. FIG. 8 is a block diagram of image correction device 20 for correcting dynamic false contour, which is introduced in the aforementioned disclosure. In FIG. 8, image correcting means 170 contains adder 3; still-picture coding circuit 4; motion-picture coding circuit 5; selector 7; differential circuit 11; coefficient circuit group 12; and delay circuit group 13. With this structure, image correcting means 170 provides an image signal with error diffusion. Image correcting means 170 is controlled by the output of movement detecting means 120 such that an error diffusion using the output from the still-picture coding circuit 4 takes place in a still-picture area, while, in a motion-picture area, an error diffusion using the output from motion-picture coding circuit 5 takes place.

In such a correction device, however, upon switching of correction process of image signals according to movement of images, some images have often produced noise with sharp edge (hereinafter referred to as switch shock) at the boundary between the still-picture area and the motion-picture area. To address the problem above, Japanese Patent Unexamined Publication No. 2001-34229 also introduces another image correction device that performs the diffusion process with the use of random numbers so as not to give sharp lines to the boundary area, whereby the switch shock is eased. The conventional image correction device, however, simply provides the boundary area with error diffusion. Therefore, with some images, the switch shock persists due to an insufficient diffusion (or other noise like jitters which is a side effect of the diffusion), and appears along the outlines of the image. Avoiding the inconveniences above has been the obstacle to an intended correction of dynamic pseudo contour.

The present invention addresses the problems above. It is therefore the object of the invention to provide a method and device for image correction capable of not only performing image signal process according to the movement of images, but also suppressing the switch shock.

SUMMARY OF THE INVENTION

The image correction method of the present invention provides image signals with image correction selected from a plurality of correction methods according to the image signal. The method provides the image correction by following procedures: detecting a motion picture area according to an image signal; comparing gradation of image signals corresponding to adjoining pixels; and providing the boundary area of the motion-picture area with diffusion in an area having gradational change smaller than a predetermined threshold. In this way, the image correction device switches the correction process between the boundary-diffused motion-picture area and other areas.

BRIEF DESCRIPTION OF THE DRAWINGS

FIG. 8 is a circuit block diagram illustrating the structure of a conventional image correction device.

DETAILED DESCRIPTION OF THE INVENTION

An exemplary embodiment of the present invention is described hereinafter with reference to the accompanying drawings.

Exemplary Embodiment

Figure 1:
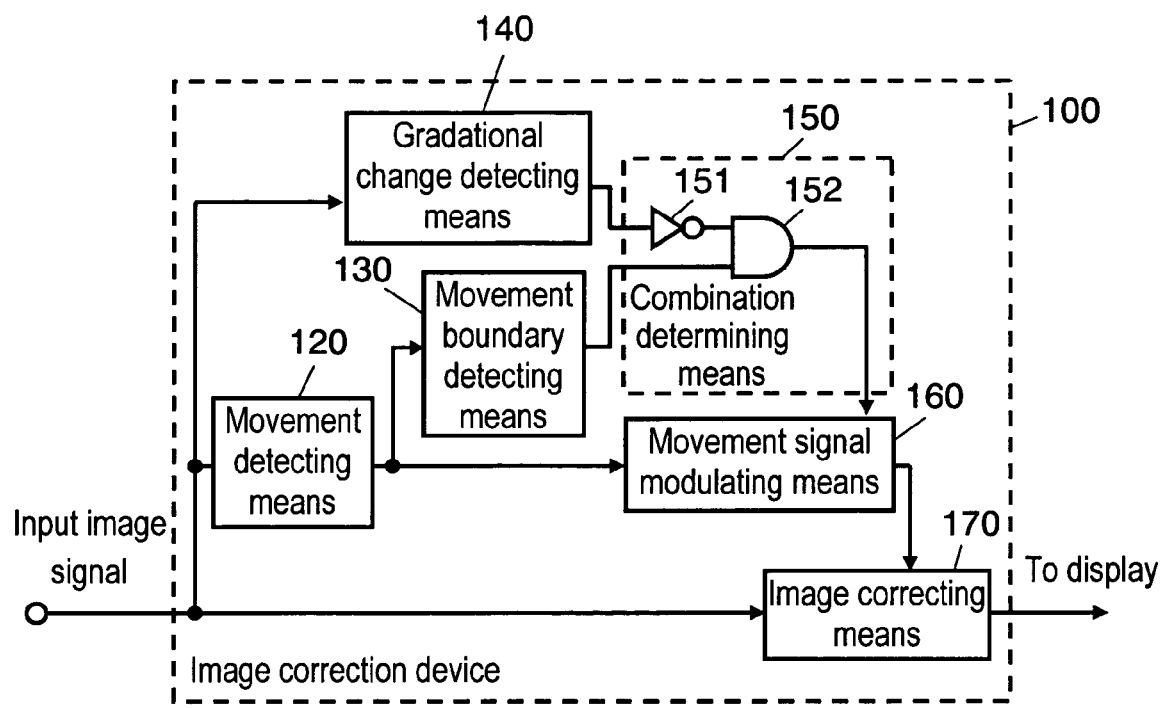
FIG. 1 is a circuit block diagram illustrating the structure of an image correction device of an exemplary embodiment of the present invention.

FIG. 1 is a circuit block diagram illustrating the structure of image correction device 100 of the exemplary embodiment of the present invention. As a typical image correction, the description of the embodiment will be made for correcting dynamic pseudo contour. Receiving an input image signal, movement detecting means 120 compares the signal to one-frame-before image signal and detects an area with big temporal gradational change (hereinafter referred to as a movement area). Movement boundary detecting means 130 detects the boundary area of the movement area. On the other hand, receiving the input image signal, gradational change detecting means 140 compares the gradation of adjoining pixels and detects an image area with big spatial gradational change. Combination determining means 150 determines the area excluding the image area with big gradational change by the following procedure: NOT-circuit 151 calculates logical NOT of the output from gradational change detecting means 140; AND-circuit 152 receives the result from NOT-circuit 151 and calculates logical conjunction of the result and the boundary area of the movement area. The logical NOT of the output from gradational change detecting means 140 shows the image area with small spatial gradational change (hereinafter, flat area); therefore, the output of combination determining means 150 shows the boundary area of the movement area that belongs to the flat area. Movement signal modulating means 160 modulates the output of movement detecting means 120 (as will be described later), whereas, for other areas, movement signal modulating means 160 sends the output of movement detecting means 120 to image correcting means 170. Image correcting means 170 of the embodiment changes a correction method according to the output of movement signal modulating means 160 so as to properly correct the dynamic pseudo contour.

Figure 2:
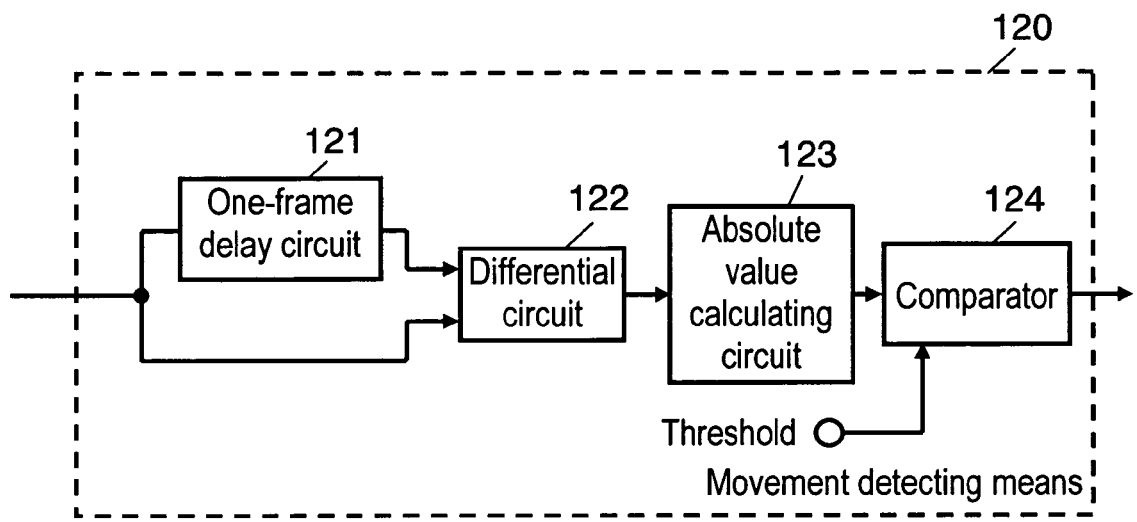
FIG. 2 is a circuit block diagram of the movement detecting means of the image correction device.
Figure 3A:
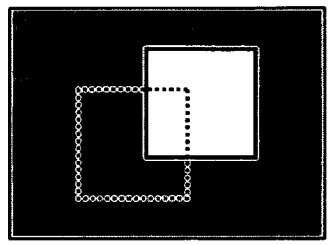
FIG. 3 illustrates the workings of the image correction device.
Figure 3B:
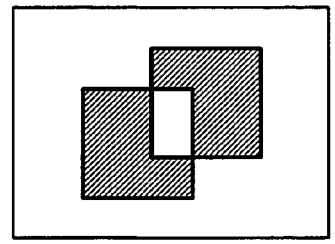

FIG. 2 is a circuit block diagram of movement detecting means 120 of the image correction device of the embodiment. One-frame delay circuit 121 delays an incoming image signal by one frame. Differential circuit 122 calculates the difference between the image signal and the one-frame-delayed image signal. Absolute value calculating circuit 123 calculates the absolute value of the difference. Comparator 124 compares the output from absolute value calculating circuit 123 to a threshold used for determining movement areas. If the output from absolute value calculating circuit 123 is greater than the threshold, comparator 124 outputs 1; otherwise, outputs 0. FIG. 3 illustrates the workings of the image correction device of the present invention. Suppose that an image signal—corresponding to a bright rectangular pattern moving in the upper-right direction against a dark background, as is shown in FIG. 3A (where, the rectangular shown by dot lines indicates the one-frame-before position of the pattern)—is coming in. Receiving the image signal, comparator 124 outputs movement area signals, as shown in FIG. 3B, according to the image signal: 1 for the movement area, 0 for other areas.

Figure 3C:
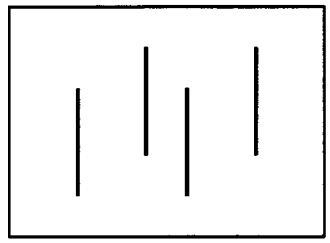
Figure 3D:
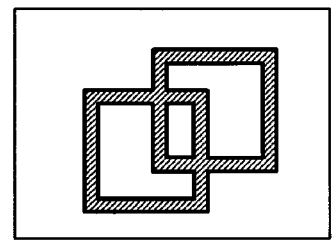
Figure 4:
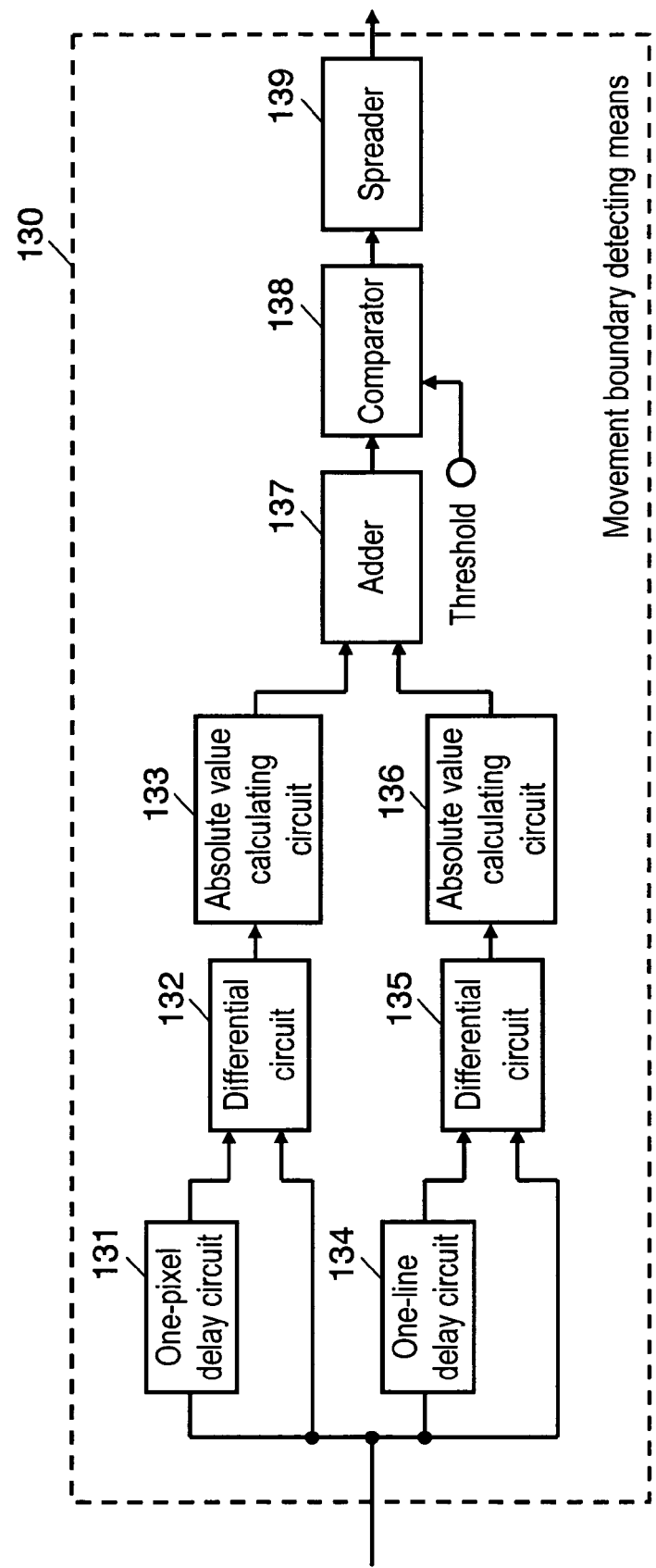
FIG. 4 is a circuit block diagram of the movement boundary detecting means of the image correction device.

FIG. 4 is a circuit block diagram of movement boundary detecting means 130 of the image correction device of the embodiment. One-pixel delay circuit 131 delays an incoming movement area signal by one pixel. Differential circuit 132 calculates the difference between the original movement area signal and the one-pixel-delayed movement area signal. Absolute value calculating circuit 133 calculates the absolute value of the difference. That is, absolute value calculating circuit 133 outputs a signal representing the horizontal boundaries of the movement area, as shown in FIG. 3C. On the other hand, one-line delay circuit 134 delays the movement area signal by one line. Differential circuit 135 calculates the difference between the original movement area signal and the one-line-delayed movement area signal. Absolute value calculating circuit 136 calculates the absolute value of the difference. That is, absolute value calculating circuit 136 outputs a signal representing the vertical boundaries of the movement area. Adder 137 adds the outputs from absolute value calculating circuits 133 and 136. Comparator 138 compares the outputs from adder 137 to a threshold used for determining boundaries. If the output from adder 137 is greater than the threshold, comparator 138 outputs 1; otherwise, outputs 0. When receiving output of 1 from comparator 138, spreader 139 gives 1 to adjacent pixels, thereby increasing the area having 1. In the embodiment, according to the number of delay circuits of movement signal modulating means 160 (as will be described later), the area having 1 is extended horizontally by five pixels, and vertically by three pixels. Comparator 138 outputs 1 with respect to the horizontal 5 pixels and vertical 3 pixels around the boundary of the movement area, and outputs 0 with respect to other areas, so that the boundary area is extended, as shown in FIG. 3D.

Figure 3E:
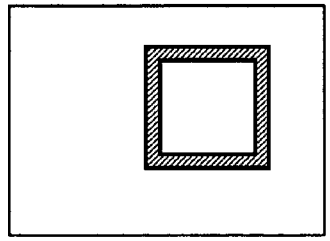
Figure 3F:
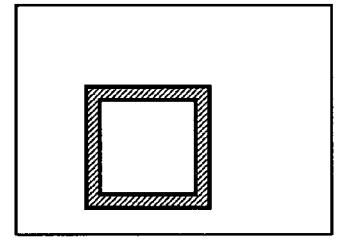
Figure 5:
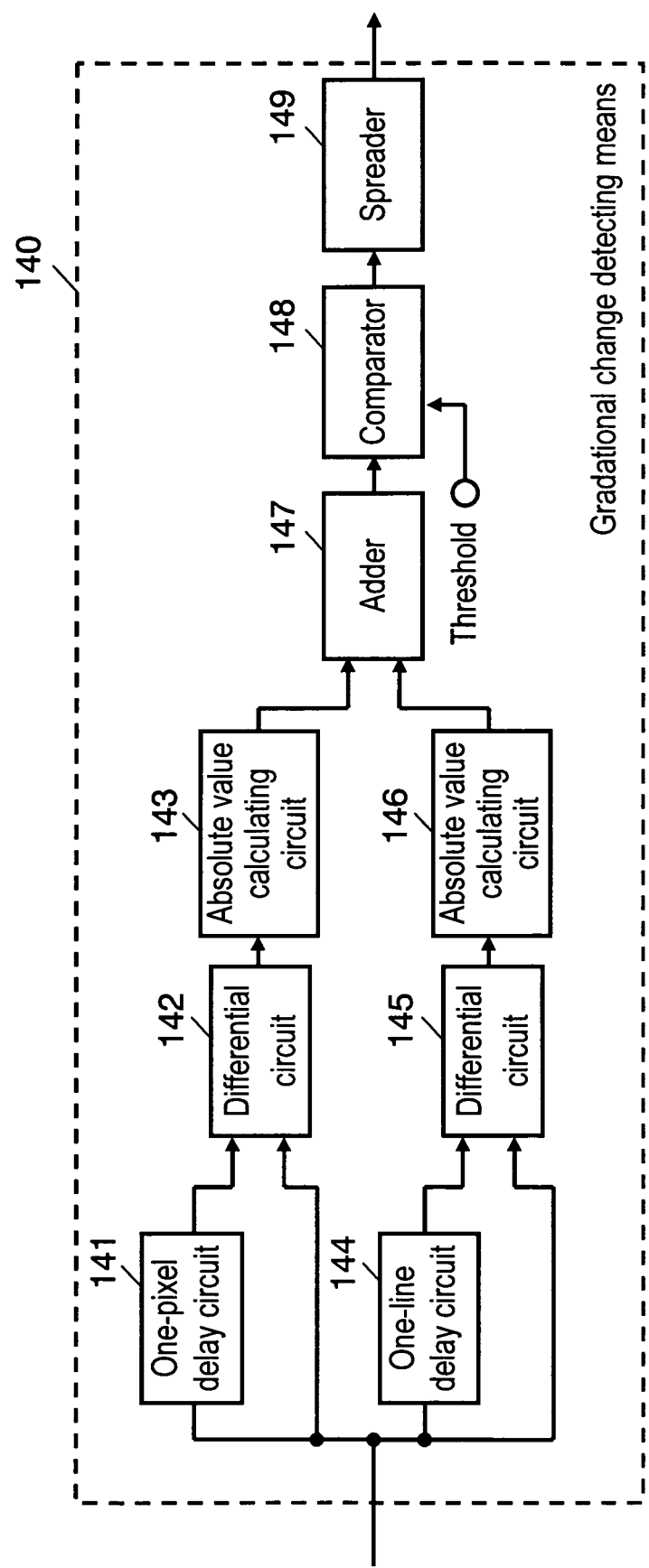
FIG. 5 is a circuit block diagram of the gradational change detecting means of the image correction device.

FIG. 5 is a circuit block diagram of gradational change detecting means 140 of the embodiment. Gradational change detecting means 140 contains one-pixel delay circuit 141; differential circuit 142; absolute value calculating circuit 143; one-line delay circuit 144; differential circuit 145; absolute value calculating circuit 146; adder 147; comparator 148; and spreader 149. The structure above is exactly alike to that of movement boundary detecting means 130, except that gradational change detecting means 140 receives an image signal as input signal. Comparator 148 outputs a gradational change signal showing the area with big gradational change, i.e., the boundary of the rectangular pattern of FIG. 3A. Therefore, as shown in FIG. 3E, comparator 148 outputs 1 with respect to the boundary of the rectangular pattern, and outputs 0 with respect to other areas. Like spreader 139, spreader 149 gives 1 to horizontal 5 pixels and vertical 3 pixels, thereby increasing the area having 1. Combination determining means 150 contains, as shown in FIG. 1, NOT-circuit 151 and AND-circuit 152. NOT-circuit 151 calculates logical NOT of a boundary change signal. Receiving the result from NOT-circuit 151, AND-circuit 152 calculates logical conjunction of the result and a movement boundary signal. As a result, the modulation control signal fed from combination determining means 150, as shown in FIG. 3F, gives 1 with respect to the boundary area of the movement area belongs to the flat area, and gives 0 with respect to other areas.

Figure 3G:
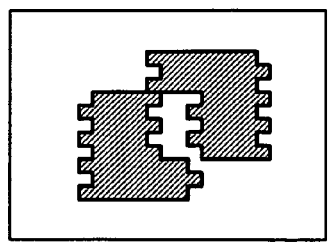
Figure 6:
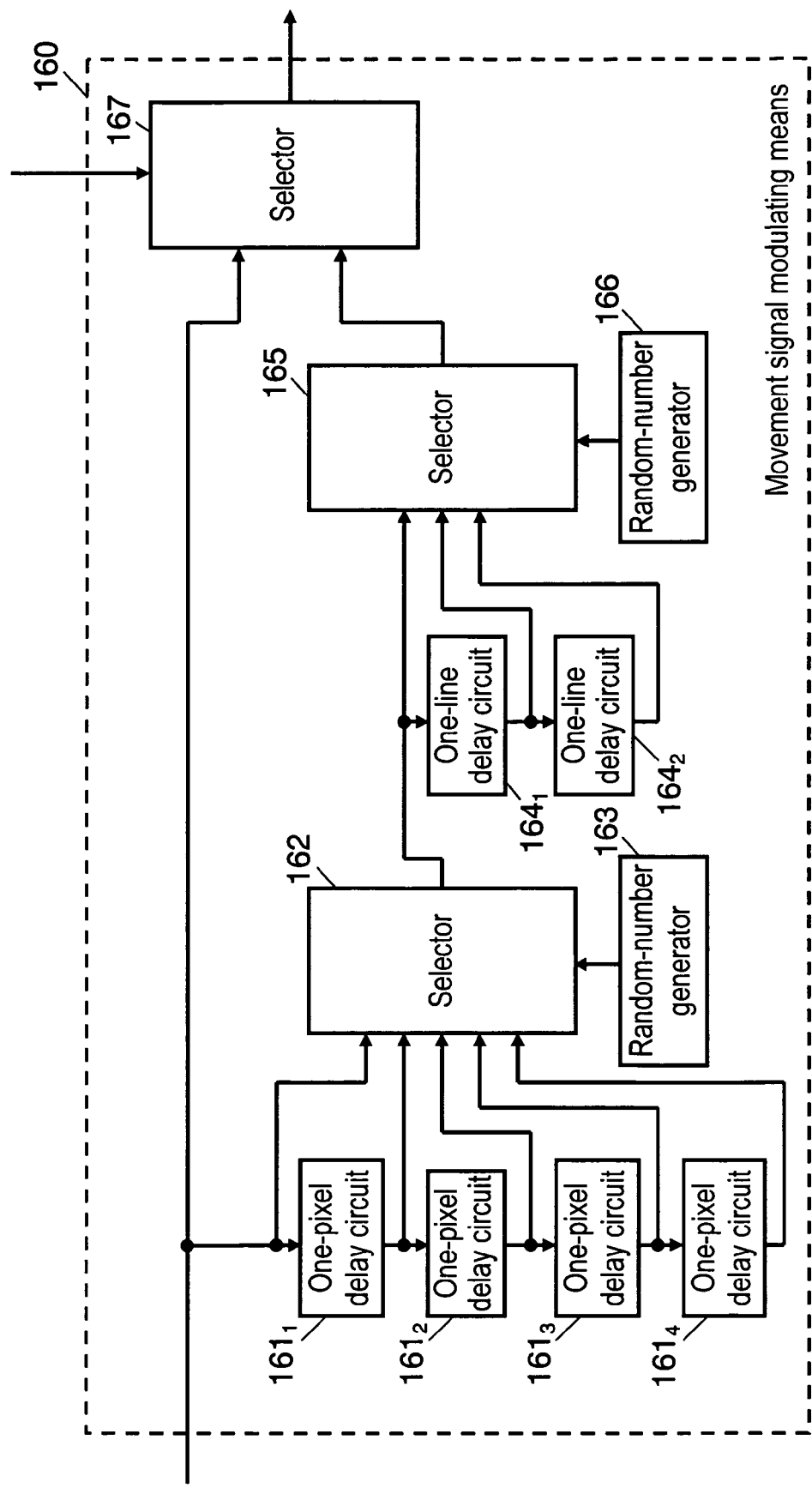
FIG. 6 is a circuit block diagram of the movement signal modulating means of the image correction device.

FIG. 6 is a circuit block diagram of movement signal modulating means 160 of the image correction device. Movement signal modulating means 160 modulates a movement area signal so as to provide a movement area with parallel movement in the horizontal and vertical directions. Movement signal modulating means 160 contains four one-pixel delay circuits $161_1$-$161_4$, which sequentially delay a movement area signal by one pixel. According to the output from random-number generator 163, selector 162 selects one signal from the original movement area signal and four delayed movement area signals. Random-number generator 163 generates a random number for each pixel; and accordingly, selector 162 outputs at latest 4-pixel-delayed movement area signal. As a result, a random diffusion is applied to the boundary of a movement area in a horizontal direction, as shown in FIG. 3G. The output from selector 162 is then fed to selector 165 and one-line delayed circuits $164_1$, $164_2$. Selector 165 selects, according to the output from random number-generator 166, one signal, which provides the boundary of the movement area with a random diffusion in a vertical direction. When a modulation control signal represents 1, selector 167 selects the horizontally and vertically modulated movement area signal. On the other hand, when the modulation control signal represents 0, selector 167 selects a movement area signal with no modulation. The selected signal is fed to image correcting means 170. As a result, the output from movement signal modulating means 160 provides the boundary of a movement area with a selective diffusion. The output signal is fed to image correcting means 170 as a correction control signal.

By virtue of the aforementioned delay circuit, the movement signal modulating means can be formed of a relatively simple structure. In addition, using the randomly selected amount of a delay of the delay circuits, the movement area is provided with a diffusion having no periodical component; thereby further suppressing the switch shock. The amount of a delay may be periodically changed by pixel, line, or field, as long as the switch shock is not recognized as an eyesore.

Figure 7:
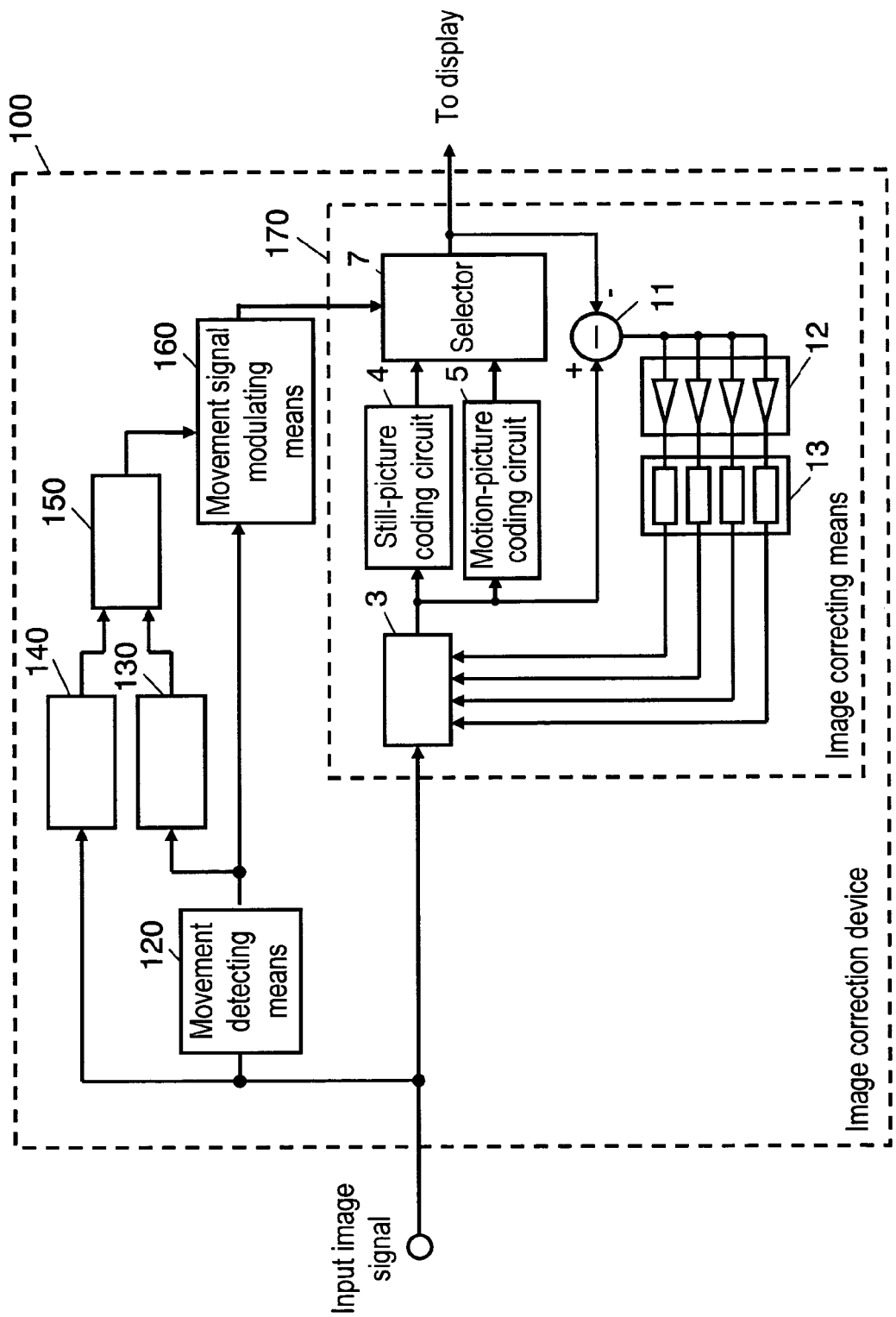
FIG. 7 is a circuit block diagram embodying the image correcting means of the image correction device.

FIG. 7 is a circuit block diagram of image correcting means 170 of the image correction device in FIG. 1. Image correcting means 170 functions as a means for correcting dynamic pseudo contour and the structure thereof is the same as that of image correcting means 170 of the conventional device shown in FIG. 8. Therefore, the circuit blocks identical to those of image correcting means 170 bear similar reference numbers and detailed explanation thereof will be omitted. In FIG. 7, when selector 7 selects the output from still-picture coding circuit 4, the correction device provides image correction capable of showing a smooth gradation although dynamic pseudo contour easily appears. On the other hand, when selector 7 selects the output from motion-picture coding circuit 5, the correction device provides image correction for suppressing the dynamic pseudo contour although the number of the gradation levels decreases.

Figure 3H:
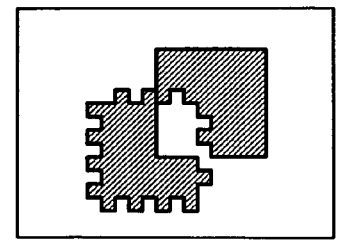

Now suppose that, like a conventional image correction device, selector 7 selects image correction according to the movement area signal shown in FIG. 3B. In this case, FIG. 3D shows the boundary at which correction control is switched. The area shown in FIG. 3F of the entire boundary of FIG. 3D is the boundary between the rectangular pattern and the background in the one-frame-before image, but in the current frame, it belongs to a flat area with small gradational change. That is, as described earlier, the boundary area is supposed to suffer the switch shock. However, according to the embodiment, the correction control signal shown in FIG. 3H is used for operating selector 7, and correction control suitable for each area is selected. At the boundary of the rectangular patterns, the correction control is switched at the boundary, whereas in the flat area susceptible to the switch shock, the boundary of correction undergoes selective diffusion. As a result, the switch shock is preferably suppressed and sufficient correction of dynamic pseudo contour is performed.

The image correction method of the embodiment, as described above, differs from the method that simply switches the image correction at the boundary of the movement area, and also differs from the method that provides the boundary area with a uniform diffusion. When switching image correction according to the movement of images, the method of the present invention provides the boundary area in a flat area—where the switch shock is likely to occur—with selective diffusion. In this way, the correction method of the embodiment not only can properly perform the image signal process according to the movement of images, but also suppresses the switch shock.

Although movement signal modulating means 160 of the embodiment employs, as shown in FIG. 6, four one-pixel-delay circuits and two one-line-delay circuits, it is not limited thereto. The number of each delay circuit can be arbitrarily defined.

In the description above, spreaders 139 and 149 are disposed in the output-side of comparators 138 and 148, respectively. Receiving the output signal from comparator 138, spreader 139 extends the width of the boundary area corresponding to the signal in a horizontal direction; similarly, spreader 149 extends the width of the boundary area corresponding to the signal from comparator 148 in a vertical direction. However, it is not limited to the structure above as long as the width of the boundary area can be extended. For example, disposing a low pass filter in the input-side of a comparator can provide the same effect.

Although image correcting means 170 of this embodiment is used for correcting dynamic pseudo contour in the description, it is not limited thereto. For example, interlace-progressive (IP) converting means, which switches image interpolation between movement areas and other areas, can generate a switch shock on a boundary. The image correction device of the embodiment is applicable to other image corrections as long as the device contains an image correcting means capable of changing the correction process according to a control signal that corresponds to movement of images.

The present invention can thus provide a method and device for image correction in which image signal processes are performed according to the movement of images, with occurrence of the switch shock preferably suppressed.

According to the present invention, the image signal process is performed according to the movement of images, with occurrence of the switch shock preferably suppressed. The device of the invention is therefore useful as the method and device for image correction that perform the image signal process according to movement of images.

The invention claimed is:

1. An image correction method comprising:
    detecting a movement area having a movement according to an image signal by comparing pixels in a frame with pixels in another frame;
    detecting a boundary area of the movement area;
    detecting a flat area in the frame having a gradational change between adjoining pixels in the frame smaller than a predetermined threshold by comparing gradation of the adjoining pixels in the frame;
    determining a first portion of the boundary area located in the flat area;
    providing the first portion of the boundary area with a diffusion process, while not providing a second portion of the boundary area with the diffusion process;
    correcting a portion of the image signal corresponding to the first portion of the boundary area by a first correction method based on the diffusion process; and
    correcting a portion of the image signal corresponding to the second portion of the boundary area by a second correction method different from the first correction method.

2. An image correction device comprising:
    movement detecting means for detecting a movement area having movement according to an image signal by comparing pixels in a frame with pixels in another frame;
    movement boundary detecting means for detecting a boundary area of the movement area;
    gradational change detecting means for detecting a flat area in the frame having a gradational change smaller than a predetermined threshold by comparing gradation of adjoining pixels in the frame;
    combination determining means for determining a first portion of the boundary area located in the flat area;
    movement signal modulating means for providing the first portion of the boundary area with a diffusion process, while not providing a second portion of the boundary area with the diffusion process; and
    image correcting means for correcting a portion of the image signal corresponding to the first portion of the boundary area by a first correction method based on the diffusion process, and correcting a portion of the image signal corresponding to the second portion of the boundary area by a second correction method different from the first correction method.

3. The image correction device of claim 2, wherein the movement signal modulating means includes a delay circuit that delays an output of the movement detecting means at least in a horizontal direction or in a vertical direction.

4. The image correction device of claim 3, wherein the movement signal modulating means provides the boundary area of the image area having movement with a diffusion process by randomly switching an amount of delay fed from the delay circuit that delays the output of the movement detecting means in a horizontal direction or in a vertical direction.

5. The image correction method of claim 1, wherein said determining of the first portion of the boundary area comprises:
    calculating the flat area by performing a logical NOT operation on an output from the gradational change detecting means; and
    determining the first portion of the boundary area by calculating a logical conjunction of a result from the movement boundary detecting means and the calculated flat area.

6. The image correction device of claim 2, wherein the combination determining means is operable to:
    calculate the flat area by performing a logical NOT operation on an output from the gradational change detecting means, and
    determine the first portion of the boundary area by calculating a logical conjunction of a result from the movement boundary detecting means and the calculated flat area.

* * * * *